Patented July 28, 1953

UNITED STATES PATENT OFFICE 2,647,105

PROCESS OF POLYMERIZING EPSILON-CAPROLACTAM

Harold R. Mighton, Kenmore, N. Y., assignor to E. I. du Pont de Nemours and Company, Wilmington, Del., a corporation of Delaware No Drawing. Application September 26, 1951, Serial No. 248,455

5 Claims. (Cl. 260—78)

This invention relates to the polymerization of cyclic amides and, more particularly, to an improved process for the polymerization of epsilon-caprolactam to film- and fiber-forming polyamides.

In commercial production of large scale batches of polyamides derived from cyclic amides such as epsilon-caprolactam, two general processes have been used. The first process involves heating an aqueous solution of the cyclic amide under pressure at a temperature above the melting point of the polymer, reducing the pressure to atmospheric, heating the melt at atmospheric pressure, and extruding the resulting polymer. This process is generally termed the hydrolytic process. The second process involves the use of catalytic amounts of a salt such as hexamethylenediammonium adipate. A small amount of the salt is heated with the cyclic amide at atmospheric pressure with a slow stream of nitrogen passing over the surface of the melt. In this process, the resulting polymer is actually a copolymer consisting of about 95% of the polymer resulting from the cyclic amide and 5% of a polymer resulting from the salt used as the catalyst, for example, polyhexamethylene adipamide.

The above processes are efficient in large batch operations. However, in these processes, they are not readily adaptable to continuous polymerization because the rate of reaction is comparatively slow.

Therefore, it is an object of the present invention to provide a process for rapid polymerization of epsilon-caprolactam to polyamide. A further object is to provide a polymerization process which is readily adaptable to continuous polymerization. A still further object is to provide a process which produces light-colored polyamides having a minimum amount of water extractables.

I have found that alkali metal hydrides, such as lithium, potassium and sodium hydrides, promote rapid polymerization (3–10 minutes) of epsilon-caprolactam to form fiber- and film-forming polyamide. Accordingly, the present invention, by which the above objects are realized, comprises heating epsilon-caprolactam with a catalytic amount of an alkali metal hydride in an inert atmosphere at a temperature above the melting point of the polymer until polymerization is complete, i. e., until a polyamide of the desired intrinsic viscosity is obtained.

In general, amounts of alkali metal hydride within the limits of 0.05 to 3 mol per cent, based on the weight of the caprolactam, will accelerate the polymerization reaction rate to a point where the reaction may be carried out continuously under commercially acceptable conditions. Catalyst concentrations in the range of 0.3 to 0.5 mol per cent are preferred.

The minimum reaction temperature for continuous polymerization must not, of course, be lower than the melting point of the polymer formed. In general, the reaction temperature should be within the range of from about 215° to about 270° C. and, preferably, within the range of from 230° to 260° C. Polymerization temperatures appreciably above 270° C. tend to cause degradation of the resulting polymer.

The caprolactam should be substantially free of water. The presence of water in excess of about 0.02% by weight retards the rate of polymerization.

The following examples are illustrative of the principles and the preferred practice of the present invention. Parts are by weight unless otherwise stated:

EXAMPE I

Epsilon-caprolactam (50 parts) was vacuum dried at 0.1 mm. for 25 hours at 50° C., and the amount of water present was reduced to 0.005%. The dried monomeric cyclic amide was thoroughly mixed with 0.0176 part (0.5 mol per cent) of powdered lithium hydride in a reaction vessel flushed with nitrogen, and the mixture was subjected to a temperature of 255° C. in an atmosphere of nitrogen. After the monomer melted, polycaproamide was formed within 3 minutes. The following table indicates the intrinsic viscosities of the polymer after heating at 255° for 5 minutes, and the resulting intrinsic viscosities on further heating at 255° C. Intrinsic viscosity $(n)$ is defined as:

$$\lim_{c \to 0} \left[ \frac{Msp}{C} \right]$$

where $$Msp = \frac{M \text{ solution}}{M \text{ solvent}} - 1$$

in which M solution is the flow time for a dilute (e. g., 0.1–0.5%) meta-cresol solution of the polymer, and M solvent is the flow time for pure meta-cresol at the temperature of measurement, and C is the concentration expressed in grams of polymer per 100 cc. of solution. The intrinsic viscosity values were obtained by extrapolating the expression, $$\frac{Msp}{C}$$

to zero concentration.

Table I

| Time | Intrinsic Viscosity $(n)$ |
|---|---|
| 5 minutes | 2.28 |
| 30 minutes | 1.29 |
| 1 hour | 1.08 |
| 2 hours | 0.88 |
| 4 hours | 0.88 |
| 8 hours | 0.73 |

The above table clearly illustrates the high intrinsic viscosity attainable with lithium hydride catalyst within an extremely short polymerization cycle. Furthermore, degradation of intrinsic viscosity upon further heating at polymerization temperatures is illustrated. The resulting polymer was subdivided into the form of a powder and extruded into a clear film which remained clear upon longitudinal stretching. The water extractables present in the film amounted to about 9%, based upon the weight of polymer.

EXAMPLE II

Thirty-two parts of dried epsilon-caprolactam were introduced into an autoclave, and 0.0112 part of powdered lithium hydride (0.5 mol per cent, or, 0.035 weight per cent) was added, with agitation as in Example I. The monomer was melted at 100° C. and, upon raising the temperature to 255° C., the molten epsilon-caprolactam was converted to polymer in 4–5 minutes. The polymer was substantially water-white and had an intrinsic viscosity of about 1.02.

EXAMPLE III

Following the procedure of Example I, samples (50 parts each) of epsilon-caprolactam were polymerized at various temperatures, namely: 218° C., 230° C. and 255° C. These samples were catalyzed with 0.5 mol per cent of lithium hydride. The following table indicates the reaction time, the intrinsic viscosity, and the amount of water extractables present in the resulting polymer:

*Table II*

| Polymerization Temperature | Reaction Time | Intrinsic Viscosity | Percent Water Extractables |
|---|---|---|---|
| 255° C | 5 minutes | 1.63 | 9.3 |
| 255° C | 30 minutes | 1.29 | 9.1 |
| 255° C | 1 hour | 1.25 | 8.6 |
| 255° C | 2 hours | 0.98 | 7.5 |
| 255° C | 4 hours | 0.96 | 7.6 |
| 255° C | 7 hours | 0.84 | 7.2 |
| 230° C | 9 minutes | 2.22 | 6.6 |
| 230° C | 30 minutes | 1.68 | 8.7 |
| 230° C | 1 hour | 1.74 | 8.0 |
| 230° C | 2 hours | 1.45 | 8.2 |
| 230° C | 4 hours | 1.40 | 5.1 |
| 230° C | 7 hours | 1.05 | 6.2 |
| 218° C | 5 minutes | | 97.0 |
| 218° C | 10 minutes | | 64.0 |
| 218° C | 15 minutes | | 46.0 |
| 218° C | 20 minutes | 2.48 | 14.6 |
| 218° C | 30 minutes | 2.48 | 5.8 |
| 218° C | 1 hour | 2.26 | 5.4 |
| 218° C | 2 hours | 1.66 | 5.6 |
| 218° C | 4 hours | 1.72 | 4.5 |
| 218° C | 7 hours | 1.52 | 4.8 |

As illustrated in Table II, the higher the polymerization temperature used, the lower the intrinsic viscosity of the polymer obtained. These data show that the equilibrium amount of water extractables was 7.0–7.5% at 255° C., 6.0 at 230° C. and 4.5–5.0% at 218° C. This example further shows that rapid reaction rates are obtained at polymerization temperatures above 230° C., but higher intrinsic viscosities are obtained at lower polymerization temperatures. Obviously, at polymerization temperatures ranging from 215° C.–230° C., longer polymerization cycles are required.

EXAMPLE IV

Following the procedure of Example I, 0.053 part (0.5 mol per cent) of sodium hydride catalyst was thoroughly mixed with 50 parts of epsilon-caprolactam in a reaction vessel flushed with nitrogen, and the mixture was subjected to a temperature of 255° C. in an atmosphere of nitrogen. After the monomer melted, polycaproamide was formed within 7 minutes. The resulting polymer had an intrinsic viscosity of 1.40, and the amount of water extractables was 10.5%.

The polymers obtained by the present invention are characterized by their high melting points and by the fact that they can be formed into filaments which yield oriented fibers on application of tensile stress, or films which may be stretched in one or more directions. They are further characterized by their microcrystalline nature, as evidenced by the sharp melting point and X-ray diffraction patterns. To be useful for forming into films or filaments, the intrinsic viscosity must be at least 0.4.

The greatest advantage of the process of the present invention is the rapid reaction rates obtainable, the process being readily adaptable for continuous operation. Furthermore, the alkali metal hydrides such as lithium, sodium and potassium hydrides, are easily handled and are readily available in very finely divided form in which they are most effective.

As many widely different embodiments may be made without departing from the spirit and scope of my invention, it is to be understood that said invention is in no way restricted except as set forth in the following claims.

I claim:

1. A process for producing polyamide which comprises polymerizing epsilon-caprolactam in the presence of a catalytic amount of an alkali metal hydride.

2. A process for producing polyamide which comprises heating epsilon-caprolactam at a temperature of from about 215° to about 270° C. in the presence of from 0.05 to 3 mol per cent of alkali metal hydride, based on the weight of the caprolactam.

3. A process for producing polyamide which comprises heating substantially dry epsilon-caprolactam at a temperature of from about 230° to about 260° C. in an inert atmosphere and in the presence of from 0.3 to 0.5 mol per cent of alkali metal hydride, based on the weight of the caprolactam.

4. The process of claim 3 wherein the alkali metal hydride is lithium hydride.

5. A process for producing fiber- and film-forming polyamides which comprises heating substantially dry epsilon-caprolactam at a temperature of from about 215° to about 270° C. in the presence of from 0.05 to 3 mol per cent of alkali metal hydride, based on the weight of the caprolactam, until a polyamide having an intrinsic viscosity of at least 0.4 is obtained.

HAROLD R. MIGHTON.

References Cited in the file of this patent

UNITED STATES PATENTS

| Number | Name | Date |
|---|---|---|
| 1,838,234 | Schirmacher | Dec. 29, 1931 |
| 2,251,519 | Joyce et al. | Aug. 5, 1941 |